(No Model.)
A. SATTER.
Tea Pot.
No. 236,181. Patented Jan. 4, 1881.
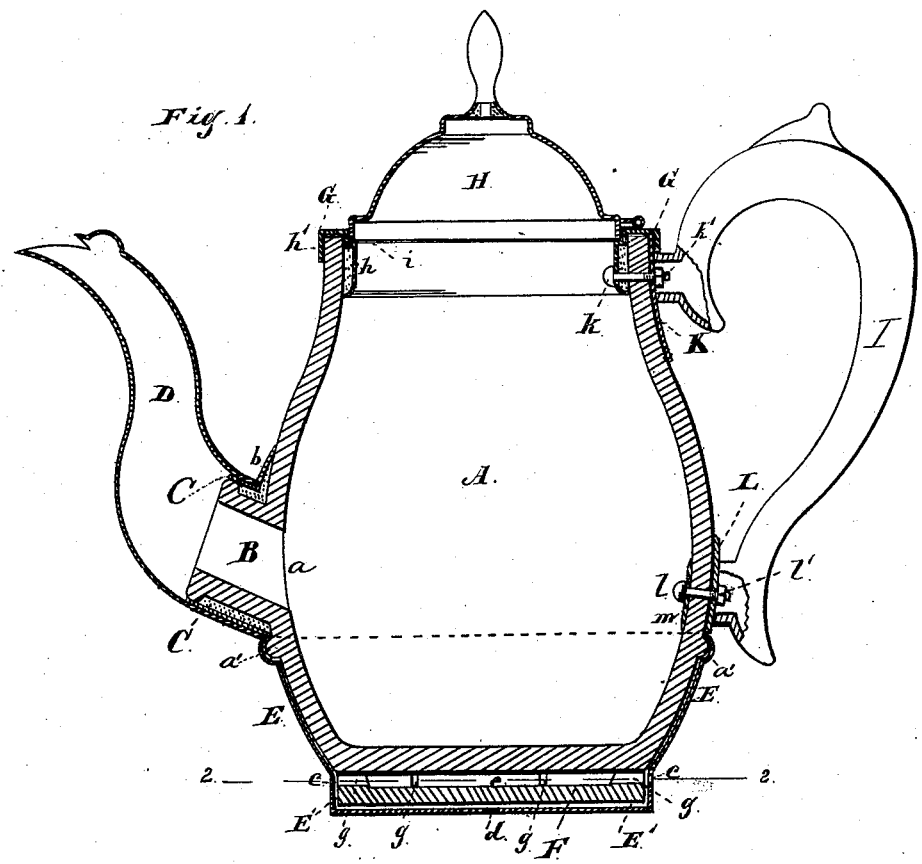
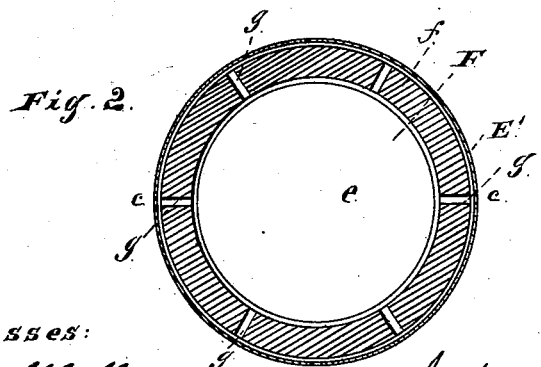

UNITED STATES PATENT OFFICE.

ANTON SATTER, OF CHICAGO, ILLINOIS.

TEA-POT.

SPECIFICATION forming part of Letters Patent No. 236,181, dated January 4, 1881.

Application filed July 10, 1880. (No model.)

*To all whom it may concern:*

Be it known that I, ANTON SATTER, of Chicago, in the county of Cook and State of Illinois, have invented a certain new and useful Improvement in Tea-Pots, of which the following is a specification.

The object I have in view is to produce an earthenware tea or coffee pot having metal handle, cover, and spout, which will be very strong in construction, will be bound at the bottom and top by metal to prevent breaking, will have the spout and handle attached by simple and efficient devices, will be protected at the bottom so as not to be damaged by the unequal expansion of the metal and earthenware, and will present a handsome appearance.

My invention therein consists in the several novel features involved in the construction of my tea or coffee pot, as more fully hereinafter explained, and pointed out by the claims.

In the accompanying drawings, forming a part hereof, Figure 1 is a central vertical section of the tea or coffee pot, and Fig. 2 a horizontal section on line 2 2 of the base of the same.

A is a pot, made of earthenware, in the usual manner, and glazed on both sides. This pot is preferably of the ordinary form of earthen tea-pots, which have a lower bulged portion and are made smaller at the open upper end. The pot A is made smooth and entire on all sides except where the spout-hole $a$ is molded. Here the pot is provided with a short spout, B, molded therewith. Over the short spout B is placed a collar, C, of metal, having a flange, $b$, which rests against the body of the pot A. The metal collar is firmly cemented to the earthen spout, while the metal flange is secured by cement to the body of the earthen pot. The metal spout D of the tea or coffee pot is rigidly soldered to the metal collar C and flange $b$.

The metal spout is not so easily broken as an earthen spout would be, and the manner of securing it to the earthen pot is very strong and simple.

The lower end of the earthen pot A is covered by a metal jacket, E, stamped or spun into the required concave shape, and secured to the sides of the pot A by being pressed at its upper edge over a bead, $a'$, formed on the pot. The jacket E is extended below the bottom of the earthen pot to form a shallow air-chamber, E', which has holes $c$ in its sides, and preferably one or more holes, $d$, in its bottom.

Within the chamber E' is situated an earthen disk, F, not connected either to the pot or jacket. This disk has a sunken center, $e$, a raised edge, $f$, upon which the pot rests, and grooves $g$ running across this edge, so that air can circulate between the pot and the disk. This separation of the bottom of the earthen pot and of the metal jacket prevents the pot from being cracked by the unequal expansion of the earthenware and metal, while the earthen disk prevents the bottom of the jacket from being bent in when hot.

The open upper end of the earthen pot is protected and strengthened by a metal ring, G, which incloses the edge of the earthen pot and is cemented thereto, having flanges $h\ h'$, which extend down both upon the inside and outside of the pot. The metal cover H is hinged to the ring G, resting, when closed, on a depressed seat, $i$, formed in said ring.

I is the metal handle, made hollow, as usual. This handle is secured to the pot by the following means: For securing the upper end of the handle, a small bolt, $k$, is passed through the inner flange, $h$, of the ring G, through the upper edge of the earthen pot, and through a metal plate, K, laid against the outside of the pot. The bolt $k$ is screw-threaded on its outer end, and is held by a nut, $k'$. The hollow handle incloses the nut $k'$ and the end of the bolt $k$, and is soldered to the plate K.

In the lower portion of the pot, above the jacket E, a bolt, $l$, passes from the inside of the pot through a washer, $m$, thence through the body of the pot, and through a plate, L, on the outside of the pot. The bolt $l$ is screw-threaded, and has a holding-nut, $l'$, inclosed within the lower portion of the hollow handle, which is soldered to the plate L.

The earthen pot can be given any desirable color and ornamented in various well-known ways, while the metal parts can be nickel-plated, so that the tea or coffee pot will be handsome and attractive in appearance.

The same features of construction as herein described could also be applied to saucepans and other cooking utensils.

The interior of the pot is wholly composed of glazed earthenware, and all the advantages possessed by this ware for cooking purposes are obtained.

What I claim as my invention is—

1. The combination, with the earthen tea or coffee pot A, of the metal jacket E, the extension E', and loose earthen disk F, substantially as described and shown.

2. The combination, with the earthen pot A, of the metal jacket E, the downward extension E', having air-holes, and the earthen disk F, having depressed center and edge grooves, substantially as described and shown.

3. The combination, with the earthen pot A, of the metal ring G, secured to the upper edge of the same, and having flanges $h\ h'$ extending down one on the inside and the other on the outside of the pot, substantially as described and shown.

4. The combination, with the earthen pot A, of the metal ring G, secured to the upper edge of the same, and having flanges $h\ h'$ and seat $i$, and the metal cover H, hinged to said ring, substantially as described and shown.

5. The earthen pot A, having the short earthen spout B molded thereon and projecting therefrom, in combination with the metal spout D, inclosing said short earthen spout and cemented thereto, the said metal spout being supported by the earthen spout, substantially as described and shown.

6. The earthen pot A, molded with the short spout B, in combination with a metal collar cemented to such earthen spout, and the metal spout D, soldered to the metal collar, substantially as described and shown.

7. The combination, with the earthen pot A, having short earthen spout B, of the metal collar C, cemented to such spout B, the metal flange $b$, cemented to the body of the pot A, and the metal spout D, soldered to said metal collar and flange, substantially as described and shown.

ANTON SATTER.

Witnesses:
 WM. ROTTHOFF,
 EMIL H. FROMMANN.